United States Patent
Shaw

(10) Patent No.: US 9,671,565 B2
(45) Date of Patent: Jun. 6, 2017

(54) HIGH-POWER PRECISION COMPACT VARIABLE-FOCUS FIBER OPTIC COLLIMATOR

(71) Applicant: BAE SYSTEMS INFORMATION AND ELECTRONIC SYSTEMS INTEGRATION INC., Nashua, NH (US)

(72) Inventor: Michael J. Shaw, Concord, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/873,587

(22) Filed: Oct. 2, 2015

(65) Prior Publication Data

US 2016/0097902 A1 Apr. 7, 2016

Related U.S. Application Data

(60) Provisional application No. 62/058,816, filed on Oct. 2, 2014.

(51) Int. Cl.
| | |
|---|---|
| *G02B 6/32* | (2006.01) |
| *G02B 6/26* | (2006.01) |
| *G02B 6/36* | (2006.01) |
| *G02B 6/38* | (2006.01) |
| *G02B 27/30* | (2006.01) |

(52) U.S. Cl.
CPC ............. *G02B 6/322* (2013.01); *G02B 27/30* (2013.01); *G02B 6/262* (2013.01); *G02B 6/3624* (2013.01)

(58) Field of Classification Search
CPC ........ G02B 6/32; G02B 6/4292; G02B 6/262; G02B 6/322; G02B 6/4226; G02B 6/4244; G02B 27/30; G02B 6/3636; G02B 6/3644; G02B 6/3652; G02B 6/3656
USPC ........ 385/25, 27, 31, 33, 39, 53, 65, 66, 74, 385/83, 84, 92, 93
See application file for complete search history.

(56) References Cited

U.S. PATENT DOCUMENTS

| | | | | |
|---|---|---|---|---|
| 4,753,510 | A * | 6/1988 | Sezerman ............ | G02B 6/3843 385/61 |
| 5,631,990 | A * | 5/1997 | Hashizume .......... | G02B 6/4204 385/92 |
| 6,035,084 | A * | 3/2000 | Haake ...................... | G02B 6/32 385/131 |
| 2002/0106149 | A1* | 8/2002 | Tehrani ..................... | G01J 3/26 385/27 |
| 2004/0247268 | A1* | 12/2004 | Ishihara ............... | A61B 5/0062 385/117 |

\* cited by examiner

*Primary Examiner* — Kaveh C Kianni
*Assistant Examiner* — Hung Lam
(74) *Attorney, Agent, or Firm* — Davis & Bujold, PLLC; Scott J. Asmus

(57) ABSTRACT

A two-part fiber optic collimator has a precision adjuster for controlling the position of a spring-biased lens carrier with respect to the collimator's body. An interchangeable fiber optic connector adaptor is attached to the collimator body for accurately positioning the end of a fiber optic cable in the collimator.

12 Claims, 3 Drawing Sheets

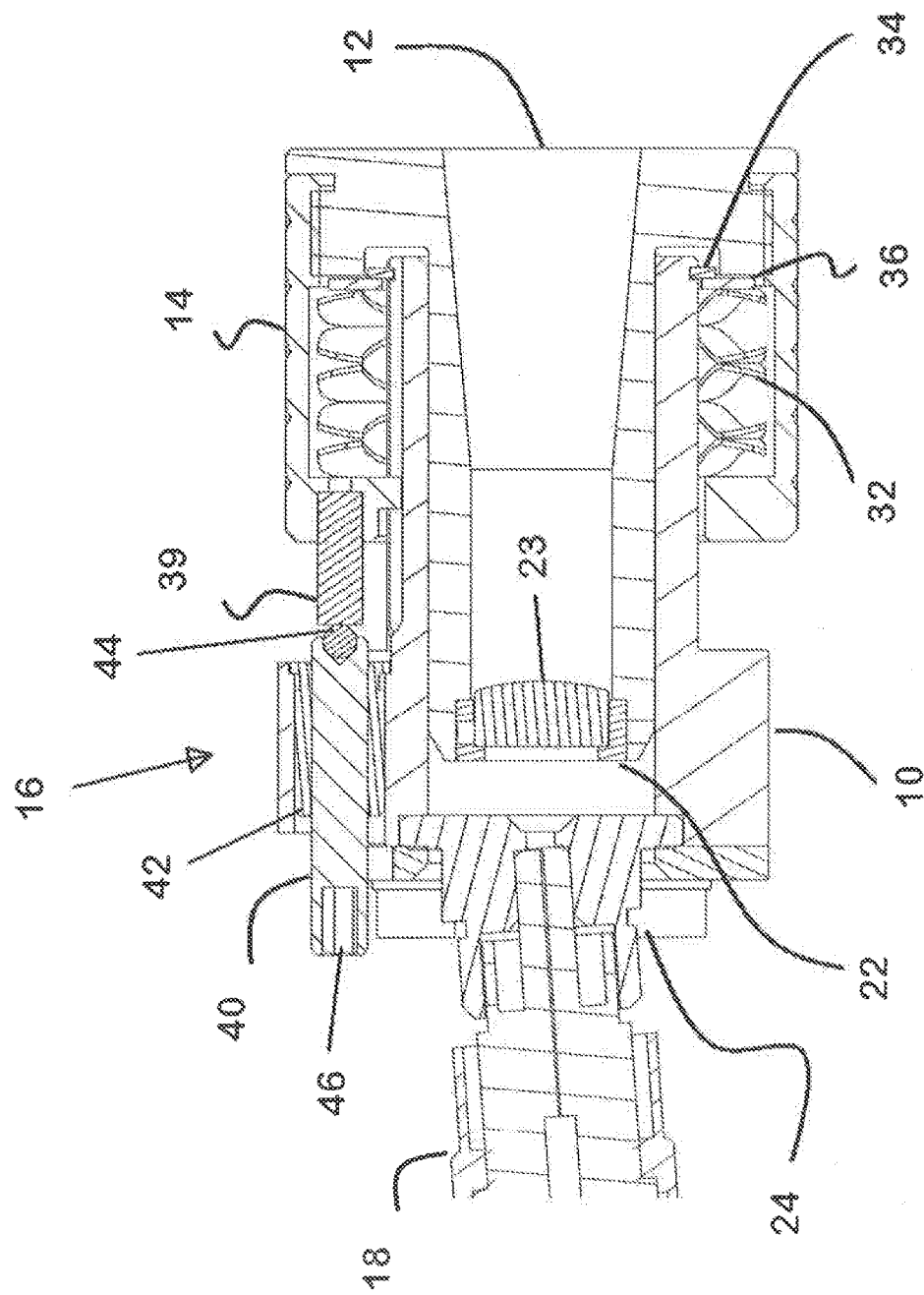

HIGH-POWER PRECISION COMPACT VARIABLE-FOCUS FIBER OPTIC COLLIMATOR

BACKGROUND OF THE INVENTION

Field of the Invention

This invention relates to lasers and fiber optics, and more particularly, to fiber optic collimators.

Brief Description of Related Art

Precision collimation of fiber optic output is critical in many fiber-to-free-space applications throughout industry and academia, for example, in optically-pumped solid-state laser applications. Fiber optic collimators are also regularly used in free-space laser communications.

Solid-state laser performance is highly dependent on a variety of factors pertaining to the pump source such as spot size, waist location, and beam quality. Managing these parameters and being able to tune them in order to optimize laser performance at high-power levels can be a difficult engineering task.

Currently available adjustable collimators address some, but not all, of the following aspects in a single device: wide operational spectral range, wide range of divergence adjustment, industry compatible fiber optic connector types, beam quality preservation, and precision adjustment resolution. In particular, most commercial collimators have a fixed distance between the fiber and the lens and a limited, inflexible focal length.

Variable focus fiber optic collimators do exist, but each of them has its limitations. Some collimators, for example, are designed with a particular integrated lens, which makes the entire collimator assembly useful only for a specific wavelength and/or a very limited focal length/range adjustment.

Another common limitation of commercial collimators is that the lens rotates when the focus is adjusted. This can sometimes add aberration and/or angular pointing of the beam during adjustment if the optical axis of the lens is not perfectly collinear with the mechanical axis of the collimator assembly.

Some commercially available collimators, which are supposedly designed for the popular FC/APC connector, do not address the angle inherent in the connector design. Because of the short distance between the fiber tip and the lens, the offset created by the FC/APC angle is sometimes considered negligible and as a result the beam does not travel through the lens perfectly on axis. This induces two types of beam aberration known as astigmatism and coma. In applications that require good beam quality, this may be unacceptable.

SUMMARY OF THE INVENTION

Wherefore, it is an object of the present invention to overcome the above mentioned shortcomings and drawbacks associated with the prior art.

An object of the present invention is to provide a two-part adjustable collimator in which one part securely and accurately holds a fiber optic connector while the opposing part holds a collimating lens, while allowing for lengthwise adjustment between the parts to accommodate a wide range of focal lengths, while not allowing for rotation of the lens during adjustment.

In the embodiment illustrated and described below, the lens is seated in a lens carrier which can move lengthwise with respect to the collimator body.

Extension of the lens carrier is controlled by an ultra-fine pitch offset adjustment screw mechanism which provides substantial total travel while maintaining single-digit micron-level resolution of lens position. Precision tolerances are employed to maintain excellent concentricity between the optical axis of the lens and the mechanical axis of the collimator assembly. The precise adjustability of the lens position results in fine resolution of beam convergence divergence or collimation, which is necessary for many different applications.

A keyway structure is provided to eliminate any rotation of the lens during the translational adjustment of the lens carrier. Materials, such as Nitronic 60 stainless steel, are chosen for the parts to minimize wear and galling of mating sliding surfaces and to minimize thermal expansion differentials without the use of lubricants, so as to maintain compatibility for use under vacuum.

The present invention allows for interchangeability of the collimating lens and thereby accommodates a wide variety of operational wavelengths, focal lengths, lens types, lens diameters, etc. A clocking feature prevents rotation of the lens during translational adjustments.

The collimator has an interchangeable fiber optic connector adapter designed to accommodate many different industry standard fiber optic connector types, so that the output beam always travels along the optical center of the collimating lens regardless of the connector type being used, angled or non-angled, preventing off-axis beam aberration.

The provision of a lens seat in the lens carrier allows the user to swap out lenses so that the focal length, lens material, optical coating, and other lens parameters can be tailored to the specific application.

The present invention relates to a fiber optic collimator comprising: a collimator body having a central bore with a longitudinal axis; an interchangeable fiber optic connector adapter secured to the collimator body, which allows the use of industry-standard, as well as custom, fiber optic cable connectors; a lens carrier having a portion disposed within said bore, and a seat for holding an optical lens; structure for preventing relative rotation between the body and the lens carrier about said longitudinal axis, while permitting relative linear motion there between along said axis; and a precision adjuster which provides for precise, continuously variable, spacing between the collimating lens and the fiber optic connector.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIG. 3 is a cross-sectional rendering of a fiber optic collimator in a fully retracted condition.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
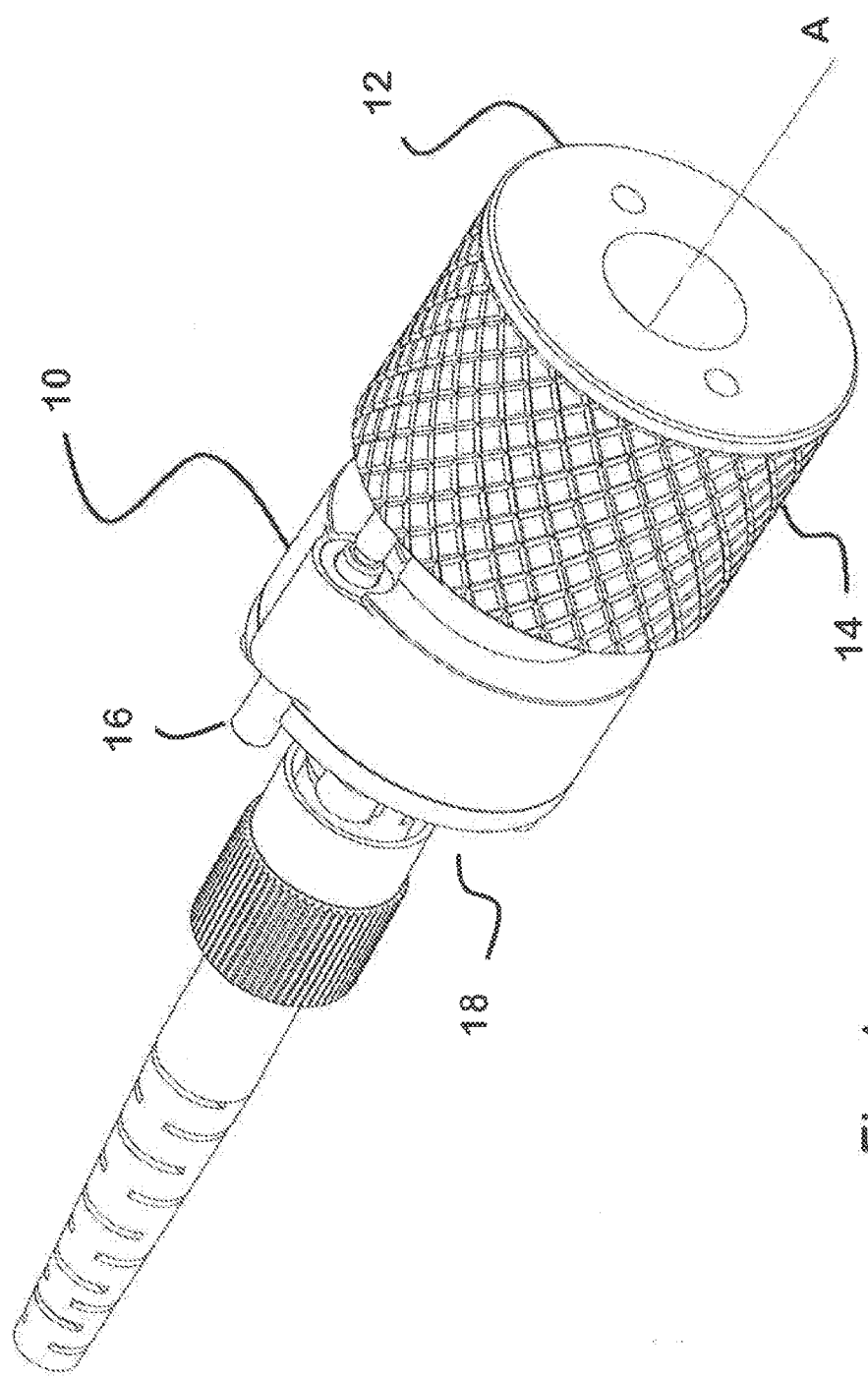
FIG. 1 is a perspective rendering of a fiber optic collimator.

As shown in FIG. 1, a collimator according to the invention contains a collimator body 10 and a lens carrier 12 fits within the body 10 and can move in telescoping fashion along a longitudinal axis "A" common to the body and the carrier. A lens carrier nut or sleeve 14 surrounds the lens carrier, and a precision adjuster 16, fixed in the collimator body, is provided to adjust the position of the lens carrier along the axis. An optical cable is connected to the end of the collimator body opposite the lens carrier by means of a fiber optic connector 18.

Figure 2:
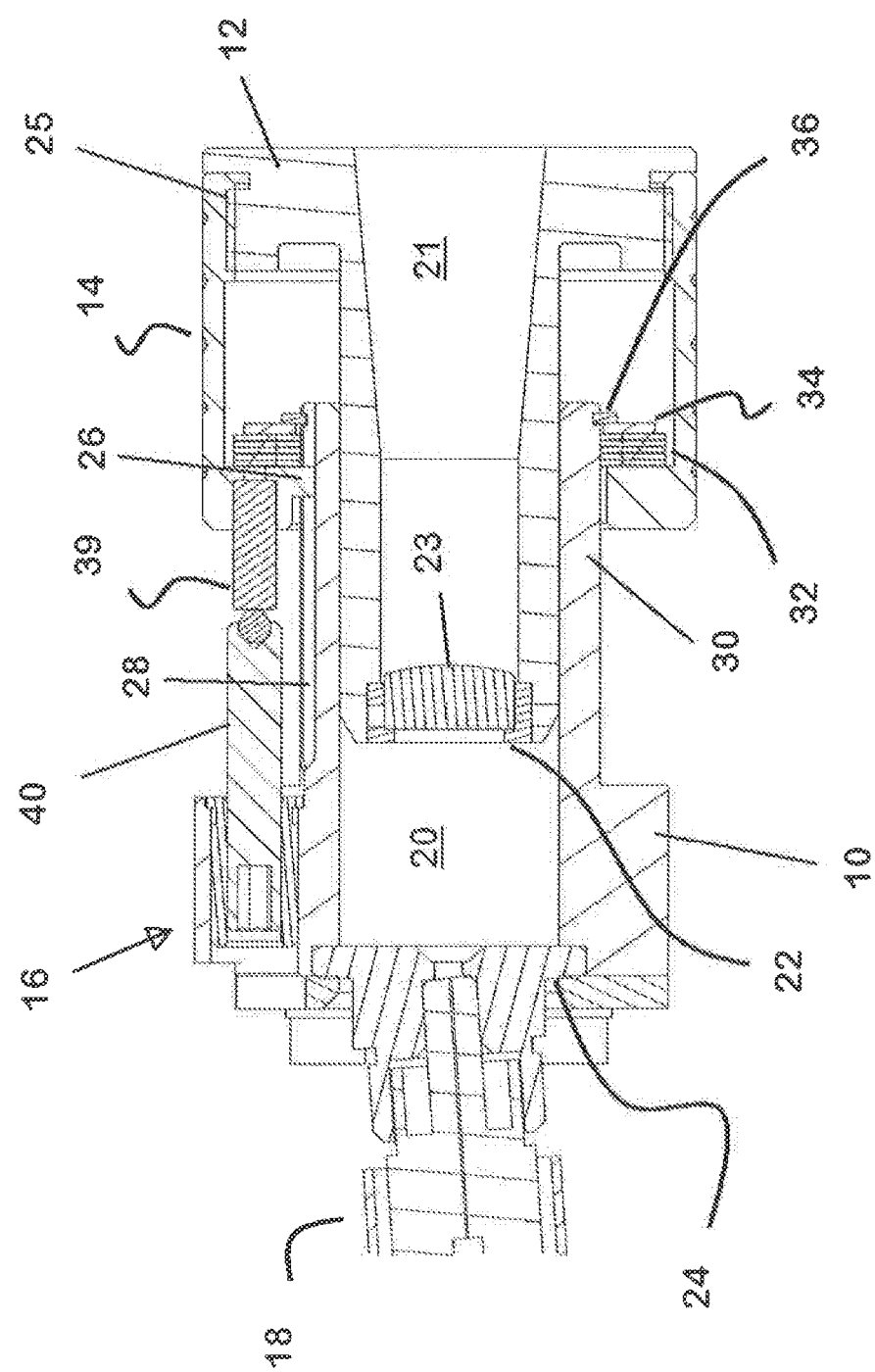
FIG. 2 is a cross-sectional rendering of a fiber optic collimator in a fully extended condition.

As seen in FIG. 2, the collimator body 10 and the lens carrier 12 are hollow, and define chambers 20 and 21 through which optical radiation may pass. The lens carrier chamber 21 diverges in the lens carrier toward its open end (from left to right in the figure), to provide an adequate clear aperture for diverging beams. The lens carrier 12, which is inserted into the open bore defining the chamber 20, has a central seat 22 into which a removable lens 23 is inserted.

An interchangeable fiber optic connector adapter 24 is secured by screws to the collimator body on the side opposite the lens carrier. A fiber optic connector 18 connects to the exterior of the interchangeable fiber optic connector adaptor 24. Optical energy, transmitted through the fiber optic cable, is emitted at the fiber optic connector according to the numerical aperture of the specific fiber being used, The free-space optical energy passes through the aperture in the fiber optic connector adapter 24, is collimated by the lens 23, then passes through the diverging lens carrier chamber and out through the exit aperture on the far end of the lens carrier.

The lens carrier nut or sleeve 14 and the lens carrier 12 have mating threads 25, and are screwed together to form a unitary assembly. The assembly itself cannot turn: it has a protruding element 26 which rides in a linear keyway 28 on the outer surface of the body extension 30. The lens carrier is thereby constrained to pure translational movement with respect to the collimator body, along the longitudinal axis.

A compression spring 32, disposed between the body extension 30 and the sleeve 14, provides a bias which tends to return the collimator to its retracted position (FIG. 3). The spring bears at one end against a backing washer 34 which in turn is retained at the end of the body extension by a retaining ring 36, and at the other end against an internal shoulder or flange 38 formed on the nut or sleeve 14.

A push pin 39 is secured in a bore in the sleeve, in axial alignment with screw 40 described below.

As shown in FIG. 3, the precision adjuster 16 comprises a finely threaded screw 40, which engages a threaded insert 42 in a through bore in the body 10. The screw preferably has a hardened ball 44 at its distal end, which engages an end of the push pin, and has a drive structure 46 at its proximal end which can be engaged by a tool. The screw is turned to adjust the position of the lens carrier relative to the collimator body, which in turn adjusts the distance between the fiber optic connector output and the lens at an ultra-precise, micron-level resolution.

In FIG. 2, the precision adjuster has been advanced, resulting in a relatively large distance between the fiber optic connector and the lens. The collimator body and the lens carrier are urged toward one another by the resistance of the return spring, in conjunction with the backing washer and retaining ring.

in FIG. 3, the collimator is fully retracted. The precision adjuster has been withdrawn, resulting in a relatively short distance between the fiber optic connector and the lens.

The collimator body and the lens carrier are held together by the resistance of the return spring, in conjunction with the backing washer and retaining ring. The clocking feature, provided by the keyway 28 and the element 26 which slides within it, prevents rotation of the lens during these translational adjustments.

While the present invention has been described in connection with the preferred embodiments of various figures, it should be understood that the invention is subject to modifications and variations. Therefore, it is intended that the present invention not be construed as being limited to any single embodiment, but rather that it be measured by the appended claims.

It will be apparent that various modifications and alterations of the described embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

What is claimed is:

1. A fiber optic collimator comprising:
   a collimator body having a central bore with a longitudinal axis;
   an interchangeable fiber optic connector adapter secured to the collimator body, which allows the use of industry-standard, as well as custom, fiber optic cable connectors;
   a lens carrier having a portion disposed within said central bore, and a seat for holding an optical lens;
   structure for preventing relative rotation between the collimator body and the lens carrier about said longitudinal axis, while permitting relative linear motion there between along said longitudinal axis; and
   a precision adjuster which provides for precise, continuously variable, spacing between the optical lens and the fiber optic connector, wherein said precision adjuster comprises a single screw received in a threaded fitting secured in a hole in said collimator body;
   further comprising a sleeve attached to said lens carrier, and extending around an exterior portion of said body, for retaining the lens carrier in the body, wherein the sleeve has an internally threaded first end, adapted to engage an externally threaded portion of said lens carrier so as to form an assembly, and a second end having an internal circumferential flange, and further comprising a compression spring disposed within said sleeve, bearing at one end against said internal circumferential flange and at the other end against a retainer affixed to the body, so as to bias the lens carrier toward a retracted position with respect to the body.

2. The collimator of claim 1, wherein the structure for preventing relative motion comprises a keyway on said body and an element attached to said lens carrier, which slides in said keyway.

3. The collimator of claim 1, wherein the precision adapter adjuster is adapted to push the lens carrier away from said body, against said bias, toward an extended position with respect to the body.

4. The collimator of claim 3, wherein the precision adjuster comprises a screw received in a threaded fitting secured in a hole in said body,-said screw having a proximal end adapted to be turned by a user and a distal end bearing directly or indirectly against said lens carrier.

5. The collimator of claim 4, wherein the distal end of the screw bears against an end of said sleeve.

6. The collimator of claim 4, further comprising a pin disposed in a bore in said sleeve, said pin and said screw extending along a common axis parallel to said longitudinal axis, whereby the distal end of the screw engages an end of the pin, which in turn drives said sleeve and said lens carrier.

7. The collimator of claim 4, wherein the distal end of the screw contains a captive hardened ball.

8. The collimator of claim 4, wherein the proximal end of the screw has drive structure adapted to be engaged by a tool.

9. The collimator of claim 1, wherein the screw is finely threaded.

10. A collimator, comprising:
a collimator body having a central bore with a longitudinal axis;
a lens carrier having a portion disposed within one end of said collimator bore, and a seat for holding an optical lens;
a sleeve coupled to said lens carrier, and extending around an exterior portion of said collimator body, wherein said sleeve retains the lens;
an interchangeable fiber optic connector adapter secured to the collimator body opposite the lens carrier, which couples to a fiber optic cable;
a protruding structure on the collimator body engaging a linear keyway for preventing relative rotation between the collimator body and the lens carrier, while permitting relative linear motion along the longitudinal axis; and
a single screw precision adjuster which provides for precise, continuously variable, spacing between the optical lens and the fiber optic connector,
wherein optical energy transmitted from the fiber optic cable passes through the optical lens and exits via an aperture;
and wherein the sleeve has an internally threaded first end, adapted to engage an externally threaded portion of the optical lens carrier so as to form an assembly, and a second end having an internal circumferential flange, and further comprising a compression spring disposed within said sleeve, bearing at one end against said internal circumferential flange and at the other end against a retainer affixed to the collimator body, so as to bias the lens carrier toward a retracted position with respect to the collimator.

11. The collimator of claim 10, wherein the precision adjuster is adapted to push the lens carrier away from said body, against said bias, toward an extended position with respect to the body.

12. The collimator of claim 10, wherein the lens carrier and the collimator body defines hollow chambers for the optical energy.

* * * * *